Sept. 21, 1965　　　　W. S. STONE　　　　3,207,371
DISPENSING DEVICE CONTAINING ADJUSTABLE METERING MEANS
Filed June 25, 1964　　　　　　　　　　　　2 Sheets-Sheet 1
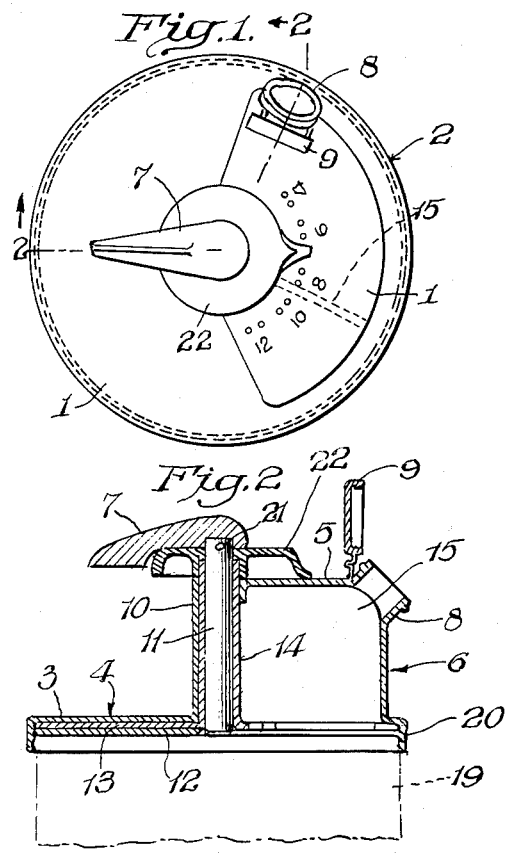
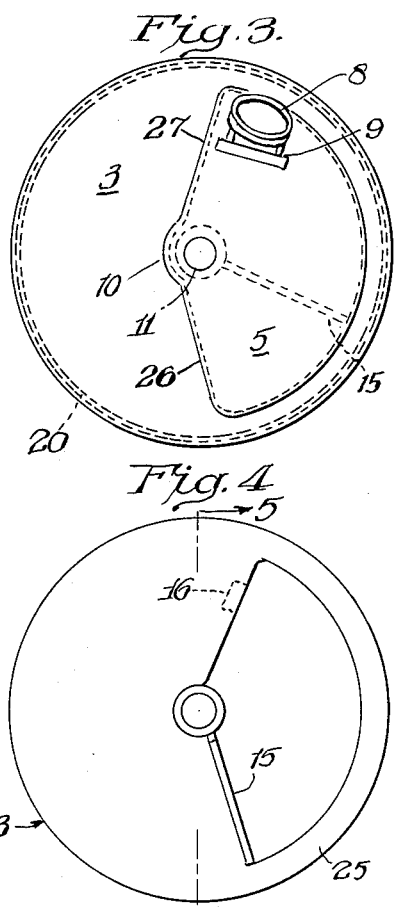
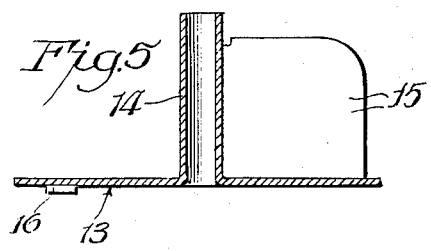
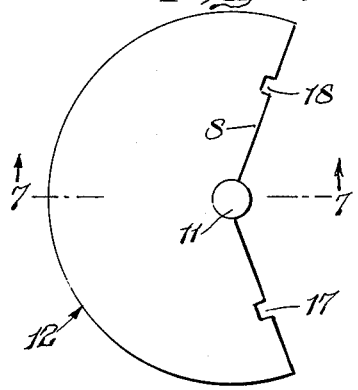
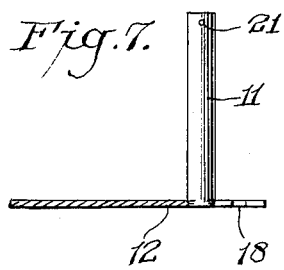
INVENTOR:
William S. Stone
BY
ATTORNEY Sept. 21, 1965   W. S. STONE   3,207,371
DISPENSING DEVICE CONTAINING ADJUSTABLE METERING MEANS
Filed June 25, 1964   2 Sheets-Sheet 2
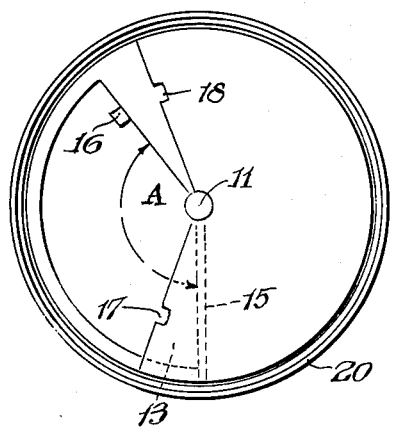
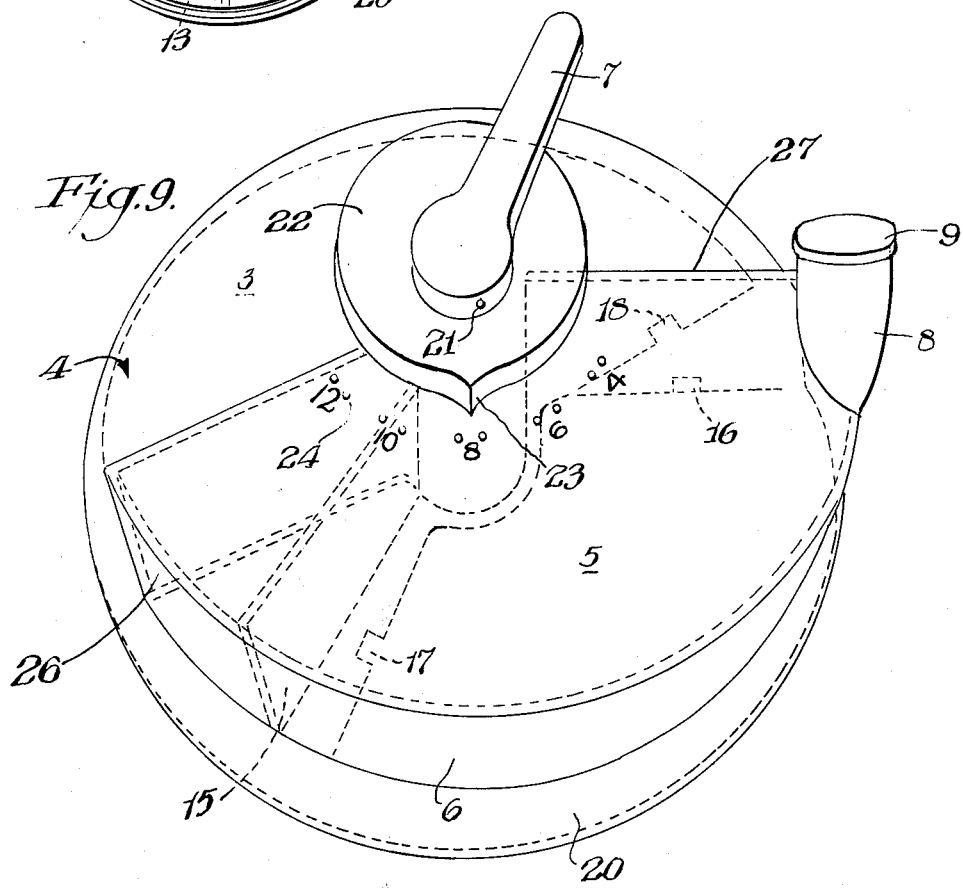
INVENTOR
William S. Stone
BY
C. H. Mortenson
ATTORNEY United States Patent Office 3,207,371
Patented Sept. 21, 1965

3,207,371
DISPENSING DEVICE CONTAINING ADJUSTABLE
METERING MEANS
William S. Stone, 2511 Deepwood Drive,
Wilmington, Del.
Filed June 25, 1964, Ser. No. 377,865
12 Claims. (Cl. 222—48)

This invention relates to an improved adjustable metering dispenser for fluids, such as granular and comminuted materials and more particularly to such a device for accurately dispensing measured amounts of flowing or fluid materials such as granular and comminuted coffee, tea, flour, spices and the like.

Conventional means for measuring coffee, tea and the like involve the use of a spoon or measuring scoop. Such elements and the procedures involved are inaccurate and spillage often results. A device that eliminates these deficiencies is desired.

An object of the invention is the provision of a device for conveniently and accurately dispensing granular and comminuted materials. Another aim is the provision of a dispensing device for granular and comminuted materials which device includes an adjustable metering or measuring compartment to permit dispensing such materials in controlled measured amounts from the container associated with the device. A further purpose is the provision of a dispenser for the aforesaid materials which is simple and inexpensive in its construction and efficient in its use. A still further objective is the provision of a device of the aforementioned character which when not in operation in dispensing the granular or comminuted materials functions as a tight closure for a previously opened container for said materials. Other goals will become apparent as the description of the invention proceeds.

These objects are accomplished by means of a device comprising a base plate fitted with an annular flange at its outer circumference adapted to fit snugly over the rim of a container for coffee and the like. Mounted on said base plate to form a unitary structure therewith is a compartment, usually semi-circular, that has a top and side walls and an adjustable bottom. The adjustable bottom comprises two rotatable discs that have areas less than the area of the opening into the container so that the discs, when they are arranged not to fully floor the compartment, afford an access to the contents in the container. Together the base plate and the compartment, which are integral, span the top of the container and, with the flange, keep it sealed.

The base plate and certain compartment walls centrally support a vertically mounted spindle rotatable by an external lever attached to the upper extremity of the spindle. Mounted on the lower extremity of the spindle and rotatable with the lever is the lowermost of the two rotatable discs. Situated about the spindle is a sleeve or cylinder to which is mounted the uppermost of the two discs. Fixed to the top of the sleeve is a turn knob for rotating the disc. The disc has fixed to it a vertical wall which, therefore, also rotates. Being located to move within the compartment, it varies the size of the chamber which is in passage-way relationship with the contents of the container. Each rotatable disc has about the same area and configuration, and, as stated, these in their respective rotations act to close and open the compartment. Each disc is rotatably supported, and is provided with slots and stop elements positioned to control the volume of the compartment accessible to receive material entering the compartment from the container. As has been noted, the compartment contains therein a moving inner wall or gate fixed to the uppermost disc. This is used to set the volume of the chamber that is to receive the materials, and there is an outlet part in the compartment for ejecting the contents of the compartment after the closing disc has closed to trap the material received from the container. The lowermost disc functions to close or open the chamber, being, in effect, a movable floor for the chamber. It may also function to remove the upper disc by the said slots and stop elements. So used, the gate will be placed in the desired position and fix the volume of the chamber as desired. However, the upper disc is preferably independently driven.

The invention will be further understood by reference to the description and the drawings which are given for illustrative purposes only and are not limitative, the drawings being described as follows:

FIGURE 1 is a plan view of the top of the device showing the calibrated markings and the rotatable knob for setting the mechanism at any desired point for dispensing the desired amount of material;

FIGURE 2 is a sectional elevation taken on the line 2—2 of FIGURE 1 and showing the container for the material such as coffee in dot and dash lines. A preferred position in the compartment for the outlet part with a movable cap closure is also illustrated;

FIGURE 3 is a plan view of the top of the device without the lever/knob control elements showing the position of the rotatable spindle which contains parts of the mechanism for metering the amount of material desired;

FIGURE 4 is a plan view showing the uppermost rotatable disc of the device with a stop element on one of its leading edges;

FIGURE 5 is a sectional elevation on the line 5—5 of FIGURE 4 and shows the rotatable chamber wall;

FIGURE 6 is a plan view of the other rotatable disc of the device with slots in each of its leading edges positioned to engage alternately the stop element shown in FIGURE 4 when the device is operated;

FIGURE 7 is a sectional elevation taken on line 7—7 in FIGURE 6;

FIGURE 8, a bottom view, shows the opening (angle A) afforded by the discs; and

FIGURE 9 is a perspective of the device.

In FIGURE 1 there is shown the top surface 1 of the device 2 which is generally made of clear plastic. The top surface is made up of the top 3 of base 4 and the top 5 of chamber 6 (see FIGS. 1, 3 and 9). The rotatable lever/pointer 7 and the orifice 8 with cap closure 9 can also be seen in these views. In FIGURE 9 the cap closure is shown in the closed position. The stationary, partially cylindrical wall 10 houses the separately rotatable spindle 11. To this at its lower extremity is attached disc 12, shown in FIGURE 2, so that when spindle 11 is turned, disc 12 turns. As can be seen in FIGURES 2 and 9, lever or handle 7 is attached to spindle 11 by a press fit or by or rivet 21, or the like. Thus, with the turning of handle 7, spindle 11 and disc 12 also turn. Lying directly above disc 12 is disc 13 which is freely rotatable about spindle 11 by means of tube 14. To this tube 14 and to disc 13 is attached gate or wall 15. At the top end of tube 14 is mounted knob 22. This knob or turn button is force fitted onto tube 14 or is attached thereto by means of a set screw or the like (not shown for convenience). Thus, with the turning of knob 22, cylinder 14, disc 13 and gate 15 also turn. Disc 13 is provided with stop element 16 (FIGURES 4 and 5) which is positioned to receive slots 17 and 18 in disc 12. While stop element 16 is shown as a projection extending downwardly from the bottom of disc 13, other types of stops may be used.

As shown in FIGURE 4, disc 13 has a rim or peripheral section 25. Disc 12 (FIGURE 6) does not have this. While rim section 25 does afford advantages in support and sealing, it is not necessary and disc 13 may be shaped like disc 12. The vertical gate or wall 15 mounted on disc 13 (FIGURE 5) is most important in controlling the amount of material entering the compartment.

The device, in operation, is placed on open container 19 shown in phantom in FIGURE 2, which contains granular or comminuted material, for example a two-pound can of ground coffee. The flange 20 connected to base 4 and chamber 6 holds the device. It is a flexible annular rim and snugly engages the sides of the can. In one embodiment of this invention there is only one turning means, for example, the manually operated lever 7 at the top of the device 2. Lever 7 is then rotated until one of the slots, say slot 17 in the disc 12, engages the stop element 16 in the leading edge of the second disc. Rotation is continued until the gate 15 on the second disc moving within the semi-circular compartment reaches a point just below the calibrated marking on the top surface of the compartment that indicates the proper position of the gate for the desired number of cups, say for four cups of coffee. The whole assembly is then inverted, and with the movable floor in the open position coffee is permitted to enter the compartment from the coffee can by gravity to fill that portion of the compartment determined by the gate position. With the assembly in the inverted position, the lever is then moved in the opposite direction until the disc 12 is in the closed position. In this position the leading edge of the spindle rotatable disc 12 just engages the stop element 16 on the second disc 13. The aperture, shown as angle A in FIGURE 8, will depend upon the location of gate 15 as to walls 26 and 27 (FIGURE 9). In FIGURE 8 the discs are shown not quite meshing for convenience. With plate 12 in the closed position the coffee now trapped in the compartment is prevented from re-entering the coffee can when the assembly is righted. The orifice in the side wall of the compartment is opened and the container is then tipped and the measured amount of coffee is poured through this part into the coffee pot or other coffee-maker. The orifice cap 9 is then closed or replaced and the closed setting of the rotatable disc 12 is maintained until the next use thus keeping the coffee fresh during storage. Disc 12 may be left in the open position, since the container is also sealed by cap 9. If greater or lesser amounts are required, the gate within the compartment is moved by the lever as explained above to bring it to the desired calibrated setting for 2 cups, 6 cups, 8 cups, 10 cups, etc.

The preferred device contains rotating means 22 as well as lever 7. In this modification, the button 22 is equipped with a pointer 23 (FIGURE 9) which can be moved over risers 24 located on the top 5 of chamber 6. The knobs 24 are shown in FIGURE 9, which shows for convenience a device of this invention of different shape than that shown in FIGURES 1-3. The risers 24 are placed in pairs at locations marked 4, 6, 8 etc. to correspond to the amount of material to be dispensed. For example, in FIGURE 9, the button 22 has been placed between the risers marked 8 to show enough coffee for 8 cups is desired. The pair of risers coact to keep point 8 held there unless sufficient force is exerted to move it. Thus, button 22 can be set in a given position and kept there for a long time. Movement of lever 7 with the attended movement of disc 12 and its slots is not enough to dislodge the setting.

Thus, the wall 15 may be put in one place and kept there for long time periods, if desired. The container is inverted and the set amount of material pours into the prescribed chamber. While still inverted, lever 7 is rotated to move disc 12 to close the chamber and lid 9 may be opened and the contents of the chamber may be ejected. Upon closing 9, while all is still inverted, lever 7 is moved in the opposite direction to remove the floor and allow material to flow into the chamber again. The same amount is delivered as the setting was not changed. This process may be repeated until the container is emptied.

Although the device is generally useful with granular and comminuted materials of numerous types, it is also useful for dispensing liquids, but it has particular use for the metering and dispensing of coffee, tea, among others.

It is conveniently made of plastics such as polyethylene, cellulose acetate, polyamides, polyformaldehyde, polyesters, polypropylene and the like. Preferably it is made of transparent materials, but metals, such as aluminum, may be used advantageously. The construction is simple and inexpensive and sturdy.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A device for dispensing materials contained in a vessel which device comprises means for attaching said device to and in sealing relationship with said vessel; a pair of variable, non-elevatable floors in said device, said floors being fixed in one horizontal plane and being rotatable in that plane; above said floor a variable chamber in said device, the said floor being adapted to lie between the contents of said vessel and said chamber; means to remove the floor to provide access of said contents to said chamber; means to replace said floor to trap any material contained in said chamber; and in said chamber an outlet for the removal from said device and said vessel of said entrapped material.

2. A device in accordance with claim 1 in which said pair of variable floors, said means to remove and said means to replace said floor comprise two rotatable discs lying one above the other and being similar in size and shape and containing a cut-out area, said discs and cut-out areas being in rotatable relationship with each other to form said pair of variable floors for said chamber.

3. A device in accordance with claim 2 which includes means to rotate the said discs.

4. A device in accordance with claim 2 in which the uppermost of said discs has mounted to it and rotatable therewith a vertically disposed wall substantially spanning the width of said chamber.

5. A device in accordance with claim 4 in which said uppermost disc has a lug extending downwardly from its bottom side.

6. A device in accordance with claim 2 in which said lowermost disc has two opposing slots and the said uppermost disc has a lug extending below it adapted to fit into said slots and drive said lowermost disc clockwise and counterclockwise as desired.

7. A device in accordance with claim 1 which includes means to attach said device to a container.

8. A device for dispensing materials comprising a base plate adapted to cover an open container of said materials, said base plate having an aperture over about one-half its surface area; attached to said base plate in vertical position and covering said aperture a semicylindrical compartment with an outlet means; an externally rotatable spindle supported in a vertical central position by said base plate by a vertical cylinder connecting said base plate and the top surface of said compartment; two coacting discs situated beneath the said base plate, the first disc being affixed to said spindle at its lower extremity and provided with an aperture corresponding to the said base plate aperture and the second disc situated between the first disc and the said base plate and held in place by a rotatable vertical cylinder surrounding said spindle; and a vertically disposed gate affixed to the upper surface of said second disc and joined on its centrally disposed vertical edge to said vertical cylinder, said gate being adapted to rotate within said compartment to regulate and measure the amount of material permitted to enter said compartment.

9. A device in accordance with claim 8 in which the said second disc carries a stop element and the leading edges of the said first disc are provided with elements positioned to engage the stop element when the discs are brought together.

10. A device in accordance with claim 8 in which the said spindle has at its top a fixed control lever arm to rotate said spindle.

11. A device in accordance with claim 8 in which the said base plate is provided with a flexible annular flange adapted to fit over and around the rim of an open container.

12. A device in accordance with claim 8 in which the top of the semi-cylindrical compartment is provided with calibrated markings corresponding to several positions of the said gate to indicate quantity of said materials admitted into the compartment in accordance with the setting of said gate.

References Cited by the Examiner
UNITED STATES PATENTS

| | | | |
|---|---|---|---|
| 2,487,825 | 11/49 | Olvis | 222—439 |
| 2,873,050 | 2/59 | Halverson | 222—450 X |
| 2,887,254 | 5/59 | Menderman | 222—450 |
| 3,179,303 | 4/65 | Dankoff et al. | 222—438 X |

M. HENSON WOOD, JR., *Primary Examiner.*

LOUIS J. DEMBO, *Examiner.*